(No Model.)

W. B. STEWARTSON.
GLASS SHADE HOLDER.

No. 273,184. Patented Feb. 27, 1883.

Witnesses.
Edwin L. Yewell.
H. A. Toulmin.

Inventor.
William B. Stewartson.
E. M. Alexander.
Attorney.

UNITED STATES PATENT OFFICE.

WILLIAM B. STEWARTSON, OF PITTSBURG, PENNSYLVANIA, ASSIGNOR TO VOIGT, WARD & CO., OF SAME PLACE.

GLASS SHADE-HOLDER.

SPECIFICATION forming part of Letters Patent No. 273,184, dated February 27, 1883.

Application filed June 22, 1882. (No model.)

*To all whom it may concern:*

Be it known that I, WILLIAM B. STEWARTSON, of Pittsburg, in the county of Allegheny, and in the State of Pennsylvania, have invented certain new and useful Improvements in Glass Shade-Holders; and I do hereby declare that the following is a full, clear, and exact description thereof, reference being had to the accompanying drawings, and to the letters of reference marked thereon, making a part of this specification.

This invention relates to an improved article of manufacture, consisting of a pressed and molded shade-holder for lamps, chandeliers, or other similar purposes; and it has for its objects to provide such holder of glass, having its walls of uniform thickness and without light deflecting or obstructing ridges, seams, lines, or parts.

This class of shade-holder has heretofore been blown in molds, and as a result of the blowing process the walls thereof have not been of uniform thickness, resulting in rendering them liable to crack on account of unequal contraction and expansion; further, the seams that are formed by the mold not only prove unsightly, but deflect and obstruct the light.

Figure 1:
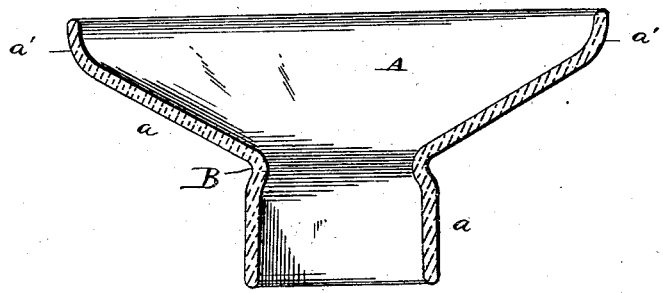
Figure 2:
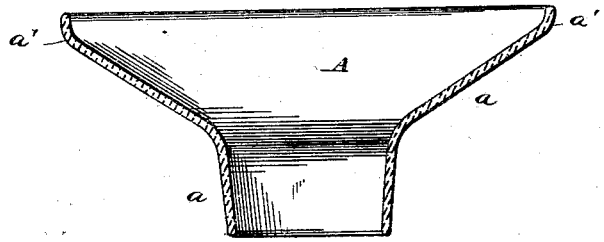

In the accompanying drawings, forming a part of this specification, and in which like reference-letters designate corresponding parts, Figure 1 represents a vertical sectional view of my improved shade-holder, showing one form thereof, the same being provided with a diametrically-contracted neck, the contraction being at the line of intersection between the cylindrical extension which surrounds the burner and the flaring or conical portion; Fig. 2, a like view, showing another form of shade-holder without the contracted neck.

The letter A indicates my improved glass shade-holder, the walls $a$ $a$ thereof being of uniform thickness, not only at any two relative or corresponding points or parts, but throughout. A circumferential bend or turn, $a'$, is given the conical portion of the holder a short distance below its upper edge, the object being to afford a vertical seat or rest for the shade. At the junction B of the neck with the conical portion of the holder the form shown in Fig. 1 is contracted diametrically for the purpose of directing the upward draft around the burner-tube toward the center.

As the apparatus and process by which my improved article of manufacture is formed constitute no part of this invention, it is unnecessary to enter into a detailed description of the same, it being sufficient for the purposes of this application to observe that the shade-holder is formed under pressure in a mold.

In order that the public may the more readily distinguish the advance which I have made in the art to which this class of invention appertains, I desire to state that I do not lay any claim whatever to the shade-holder just referred to as being already known, my improvement consisting essentially in producing a holder whose walls shall be of uniform thickness, and which is entirely free from ridges, seams, and other light-deflecting lines.

Having thus fully described my invention, what I claim as new, and desire to secure by Letters Patent, is—

A new article of manufacture consisting of a pressed and molded glass shade-holder, having its walls of uniform thickness and formed without light-deflecting or obstructing ridges or parts, substantially as specified.

In testimony whereof I affix my signature, in presence of two witnesses, this 5th day of May, 1882.

W. B. STEWARTSON.

Witnesses:
J. J. MCCARTHY,
CHARLES D. DAVIS.